Inventor:

Wolfgang Rank

United States Patent Office 3,278,678
Patented Oct. 11, 1966

3,278,678

MAGNETIC RECORDING AND REPRODUCING OF VIDEO SIGNALS, SYNCHRONISING IMPULSES AND AUDIBLE FREQUENCIES

Wolfgang Rank, Kronach, Upper Franconia, Germany, assignor to Loewe Opta Aktiengesellschaft, Berlin, Germany, a company of Germany Filed Aug. 20, 1962, Ser. No. 219,364
2 Claims. (Cl. 178—6.6)

For the magnetic recording of television image signals a known method uses a magnetic medium or tape which carries besides the video signal a synchronising track lying, e.g., along one edge of the tape. A further recording track runs along the other edge of the tape and contains the sound accompanying the video recordings. Both additional tracks demand the previous erasure of a border portion of the video recordings, which substantially reduces the width of tape available for the video recordings. According to another method known the sound track could be put on over the whole video tracks, but in this case the video tracks will be recorded before the recording of the sound signals. By recording the sound-signal track overlapping the previously recorded video-signal tracks it is inevitable that on the overlapping points the video tracks will be attenuated or erased by the sound signals. If such a recording will be played back distortions in horizontal and vertical synchronism of television signals will occur.

An object of this invention is to avoid the distortions arising from the attenuation of the recorded television signals.

The present invention overcomes this difficulty by providing a novel magnetic recording and playback apparatus comprising a first magnetic head mounted on a rotatable carrier and forming or scanning oblique and parallel magnetic tracks of video signals on a magnetic tape encircling said carrier in a helical loop, and a second magnetic head mounted fixedly and forming or scanning a magnetic track of low frequency signals on said tape in a longitudinal direction, said second magnetic head being spatially mounted, referred to direction of tape run, before said rotatable carrier supporting said first magnetic head, so that said tracks formed by said first magnetic head mask said track formed by said second magnetic head.

This produces apart from better exploitation of the tape width better reproduction of the television image, because at the crossing points and/or surfaces of the tracks erasure or attenuation of the first-recorded tracks that are the sound track or tracks and/or the synchronising track occurs, which is however constant provided the width and distance of the basic tracks are executed evenly. Quality of reproduction of the video signals, synchronising signals and sound signals is not disturbed by the crossing recording tracks, it is merely necessary to raise the level of the attenuated recording track or tracks to the intended value.

Figure 1:
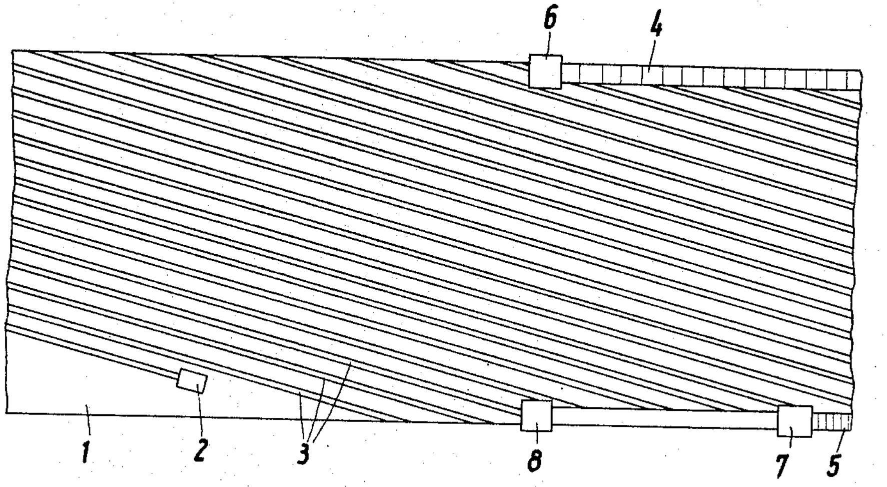
Figure 2:
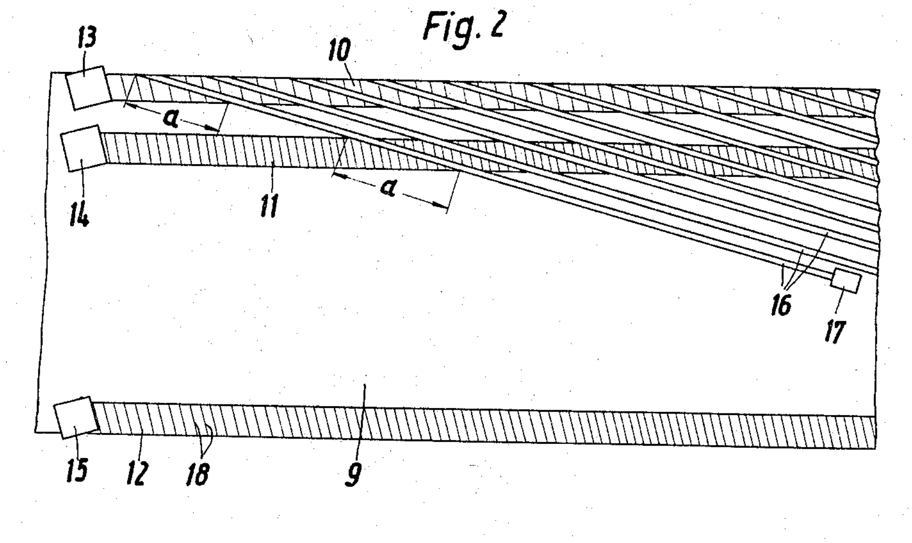

Details of the invention are explained with references to the accompanying drawing, of which FIG. 1 represents a known arrangement and FIG. 2 an example of a design in accordance with the invention.

According to a known method not illustrated in the drawing a magnetic tape runs for the purpose of recording and reproducing video signals, synchronising signals and sound signals obliquely on to a rotating carrier supporting a video-magnetic-head 2. Here the tape receives video recording tracks 3 lying obliquely to the direction of run of the tape, which tracks fill its entire width. The borders of the tape have on them a synchronising track 4 and a sound track 5, which are recorded by fixed magnetic heads 6 and 7. At a certain distance before the magnetic head 7 there is an erasing head 8, also fixed, which erases the video recording tracks for the sound recording. Magnetic head 6 is represented as a combined erasing, recording and reproducing head, so that simultaneously with the recording of the synchronising signals the upper border portion of the video recording is erased.

The magnetic tape 9 illustrated in FIG. 2 has in accordance with the invention a synchronising track 10 recorded parallel to its direction of run, a sound track 11 and a further track 12 for special signals. The tracks 10, 11 and 12 are recorded by the fixed magnetic heads 13, 14 and 15, which are arranged referred to the direction of tape run before the rotating video magnetic head carrier. Over the tracks 10, 11 and 12 the video tracks 16 are recorded by a video-magnetic head 17, whereby, because of the oblique position of video tracks 16 conditioned by the recording method, within the portions marked *a* superposing of tracks 10, 11 and 12 and the video tracks 16 occurs. This superposing affects the first recorded tracks in the form of attenuation, which however, can be kept within tolerable bounds when tracks 10, 11 and 12 are made double or several times as wide as the video tracks 16.

It is also possible to record the video tracks and the synchronising and sound tracks parallel and over each other—this is not illustrated in the drawing—and by correspondingly tilting the operating air gap of the magnetic heads to separate the tracks magnetically. In this case the direction of magnetisation of the video tracks is, e.g., in the direction of tape run and the direction of magnetisation of the synchronising and video frequency tracks at about right angles to the direction of tape run. Thus no influence or attenuation of the two types of track occurs, despite identity of track direction, and in reproduction only the magnetic heads associated with the appropriate direction of magnetisation are effective. This arrangement can also be applied in the exemplary design in FIG. 2, in which the magnetic heads 13, 14 and 15 and/or their operating air gaps are placed somewhat obliquely, so that the direction of magnetisation of tracks 10, 11 and 12 indicated by the lines 18 is at a definite angle to the direction of magnetisation of the recorded video tracks. This enhances the crosstalk attenuation between the individual tracks to a degree unattainable with the arrangements under the present state of the art.

What I claim is :

1. A magnetic recording and playback apparatus comprising a first magnetic head mounted on a rotatable carrier and forming or scanning oblique and parallel magnetic tracks of video signals on a magnetic tape encircling said carrier in a helical loop, and a second magnetic head mounted fixedly and forming or scanning a magnetic track of low frequency signals on said tape in a longitudinal direction, said second magnetic head being spatially mounted, referred to the direction of tape run, before said rotatable carrier supporting said first magnetic head, so that said tracks formed by said first magnetic head mask said track formed by said second magnetic head.

2. A magnetic recording and playback apparatus as claimed in claim 1, wherein instead of said second magnetic head two or more heads are mounted side by side.

References Cited by the Examiner

UNITED STATES PATENTS

| | | | |
|---|---|---|---|
| 2,989,595 | 6/1961 | Hunter | 179—100.2 |
| 3,099,709 | 7/1963 | Barry | 178—6.6 |

DAVID G. REDINBAUGH, *Primary Examiner.*

H. W. BRITTON, *Assistant Examiner.*